Figure 1:
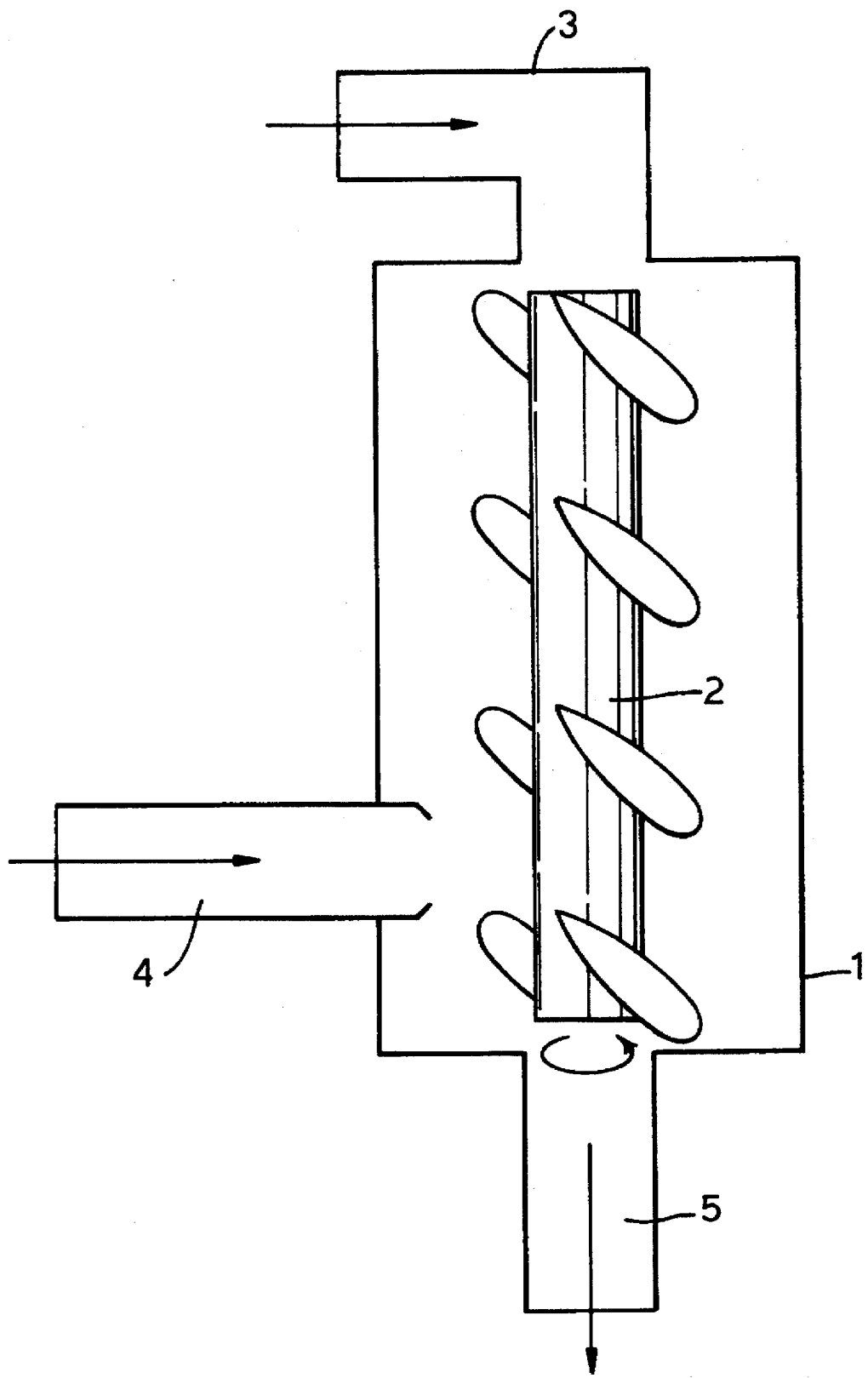

United States Patent

Dahms et al.

Patent Number: 5,698,251
Date of Patent: Dec. 16, 1997

[54] METHOD OF PREPARING MULTICOLORED ICE CONFECTIONS

[75] Inventors: Claus Martin Dahms, Happeheim; Erhard F. Moraw; Gunther Horst Schubert, both of Reken, all of Germany

[73] Assignee: Good Humor-Breyers Ice Cream, Division of Conopco, Inc., Green Bay, Wis.

[21] Appl. No.: 559,268

[22] Filed: Nov. 15, 1995

[30] Foreign Application Priority Data

Nov. 16, 1994 [EP] European Pat. Off. ............ 94308450

[51] Int. Cl.[6] ........................................ A23G 9/00
[52] U.S. Cl. ...................... 426/249; 426/516; 426/565
[58] Field of Search ........................... 426/565, 566, 426/567, 516, 249

[56] References Cited

U.S. PATENT DOCUMENTS

| | | | |
|---|---|---|---|
| 3,635,727 | 1/1972 | Ehrgott | 426/516 |
| 3,908,867 | 9/1975 | Raitt | 222/145 |
| 4,015,644 | 4/1977 | Kinney | 141/9 |
| 4,116,369 | 9/1978 | Crowder | 222/145 |
| 4,378,164 | 3/1983 | Manfroni | 366/177 |
| 4,500,553 | 2/1985 | Liggett et al. | 426/101 |
| 4,504,511 | 3/1985 | Binley | 426/565 |
| 4,873,104 | 10/1989 | Butcher et al. | 426/249 |
| 4,881,663 | 11/1989 | Seymour | 222/145 |
| 5,283,070 | 2/1994 | Bertrand et al. | 426/565 |

FOREIGN PATENT DOCUMENTS

| | | |
|---|---|---|
| 624 256 | 3/1991 | Australia. |
| 0 221 757 | 5/1987 | European Pat. Off.. |
| 0 470 326 | 2/1992 | European Pat. Off.. |
| 0 485 654 | 5/1992 | European Pat. Off.. |
| 0 503 254 | 9/1992 | European Pat. Off.. |
| 0 615 692 | 9/1994 | European Pat. Off.. |

*Primary Examiner*—George Yeung
*Attorney, Agent, or Firm*—James J. Farrell

[57] ABSTRACT

Multicolored ice convections are a popular consumer product and are often sold in tubs. A multicolored marbled effect is obtained in an ice convection by mixing the streams of different colors in a paddle extruder.

1 Claim, 1 Drawing Sheet

METHOD OF PREPARING MULTICOLORED ICE CONFECTIONS

FIELD OF THE INVENTION

This invention relates to the preparation of a multicolored ice confection product marketed in containers, e.g. plastic tubs, and displaying the multicoloring on the upper surface.

BACKGROUND OF THE INVENTION

Ice confection products are known which have a 'ripple' or continuous swirl throughout the product. The 'ripple' or swirl will usually have a different flavour and is often a syrup or sauce. However, to date it has not been possible to provide a product having two or more different colored streams of ice confection, where the different streams are not as distinct as in the 'rippled' products of the prior art, but nevertheless a degree of distinction is retained between the colors. Such products can be described as having a "marbled" pattern.

GENERAL DESCRIPTION OF THE INVENTION

It has been found that the desired marbled effect can only readily be achieved by the use of a paddle extruder. The paddle extruder provides a sufficient degree of mixing while retaining distinction between the colors.

The invention provides a method of dispensing a multicolored ice confection product into a container in order to achieve a marbled effect, wherein a first stream of ice confection is introduced into a screw extruder and a second stream, having color contrast with the first stream, is introduced into the extruder downstream of the first input and adjacent the outlet.

SPECIFIC DESCRIPTION OF THE INVENTION

By marbled effect is meant that the swirl pattern achieved by the different colored ice confections is not continuous, i.e. the swirl pattern is interrupted and there is some interface between the colors.

The term ice confection includes for example ice cream, frozen yoghurts, milk ice and frozen custards.

An embodiment of the invention will now be given to illustrate but not limit the invention with reference to the accompanying diagrammatic drawings in which:

FIG. 1 is a sectional view of an extruder.

Extruder barrel 1 was thermally insulated and mounted vertically. It has an internal diameter of 15 cm and an internal length of 80 cm. The axle 2 was rotated by means not shown at speeds between 5 and 50 revs min$^{-1}$ and carried 4 pairs of paddles. Conduits 3 and 4 introduced streams of ice cream I and II into the extruder barrel. The total rate of introduction of I and II was 3600 liters hr$^{-1}$; I was introduced at a rate between 1200 and 2400 liters hr$^{-1}$ and II at a rate between 2400 and 1200 liters hr$^{-1}$. Stream II had a different color and flavour to stream I and the paddle extruder operated to mix the two streams so they retained their separate characteristics. Thus the two streams were not intimately mixed to give an output with a single color.

The output stream was obtained from conduit 5 and received in plastic containers having both round and square areas. Volumes of 0.5, 1 and 1.5 liter were dispensed. Introduction of stream II considerably downstream of I, that is near the output conduit 5, produces a product which has an attractive marbled effect which is visible on the upper surface. The main color being provided by stream I with stream II forming a swirl or spiral from the center.

Additional colors can be introduced in the swirl pattern by introducing other ice cream streams or sauces/syrups into the paddle extruder adjacent the outlet conduit.

We claim:

1. A method of dispensing a multicolored ice confection having a marbled effect into a container, comprising:

(i) introducing a first stream of ice confection into a paddle extruder;

(ii) introducing a second stream of ice confection having a color contrast with the first stream into the extruder downstream of the first stream to provide a combined stream of ice confection having a marbled effect; and (iii) dispensing the combined stream of ice confection into a container.

* * * * *